United States Patent Office 2,758,196
Patented Aug. 7, 1956

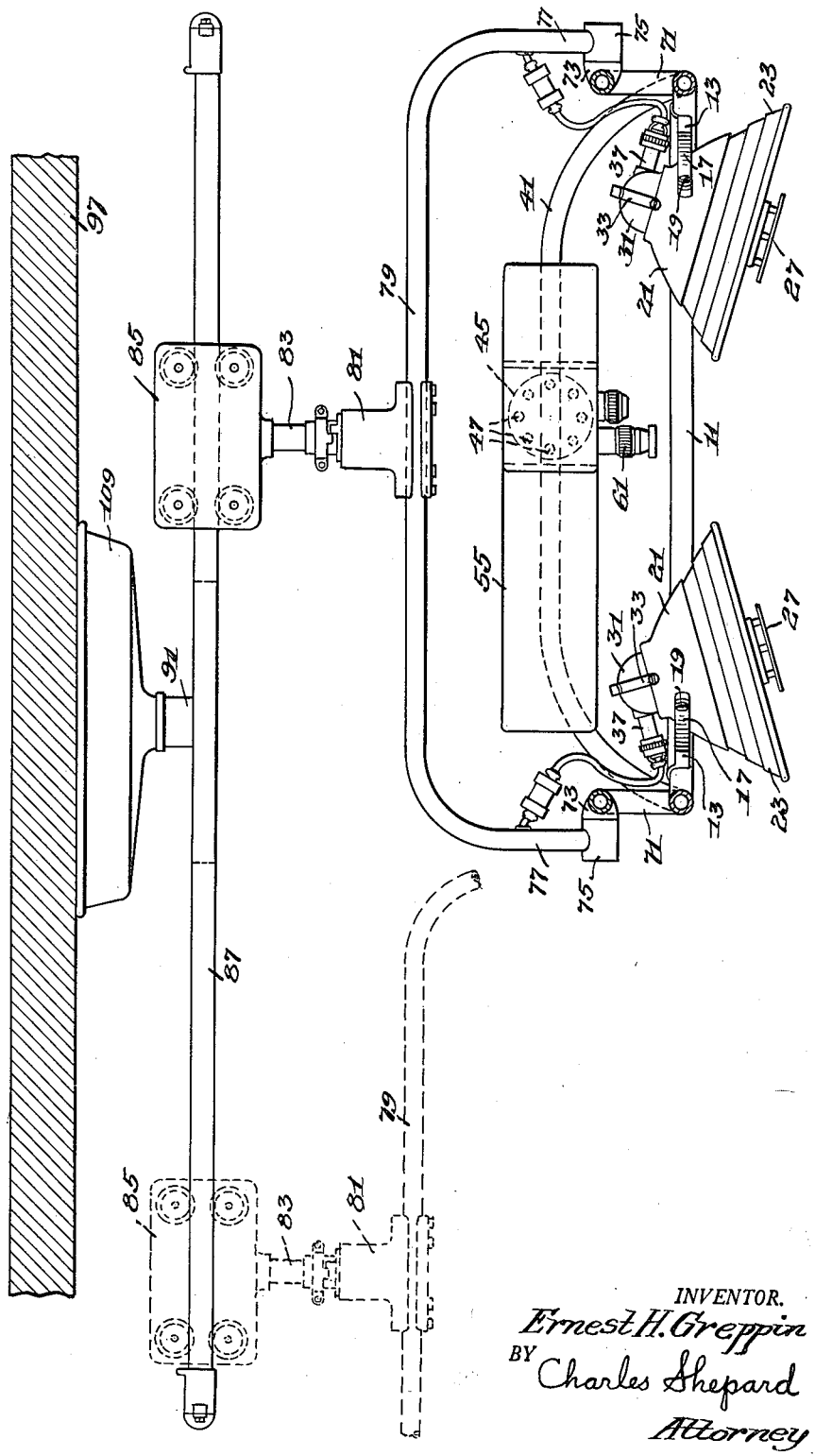

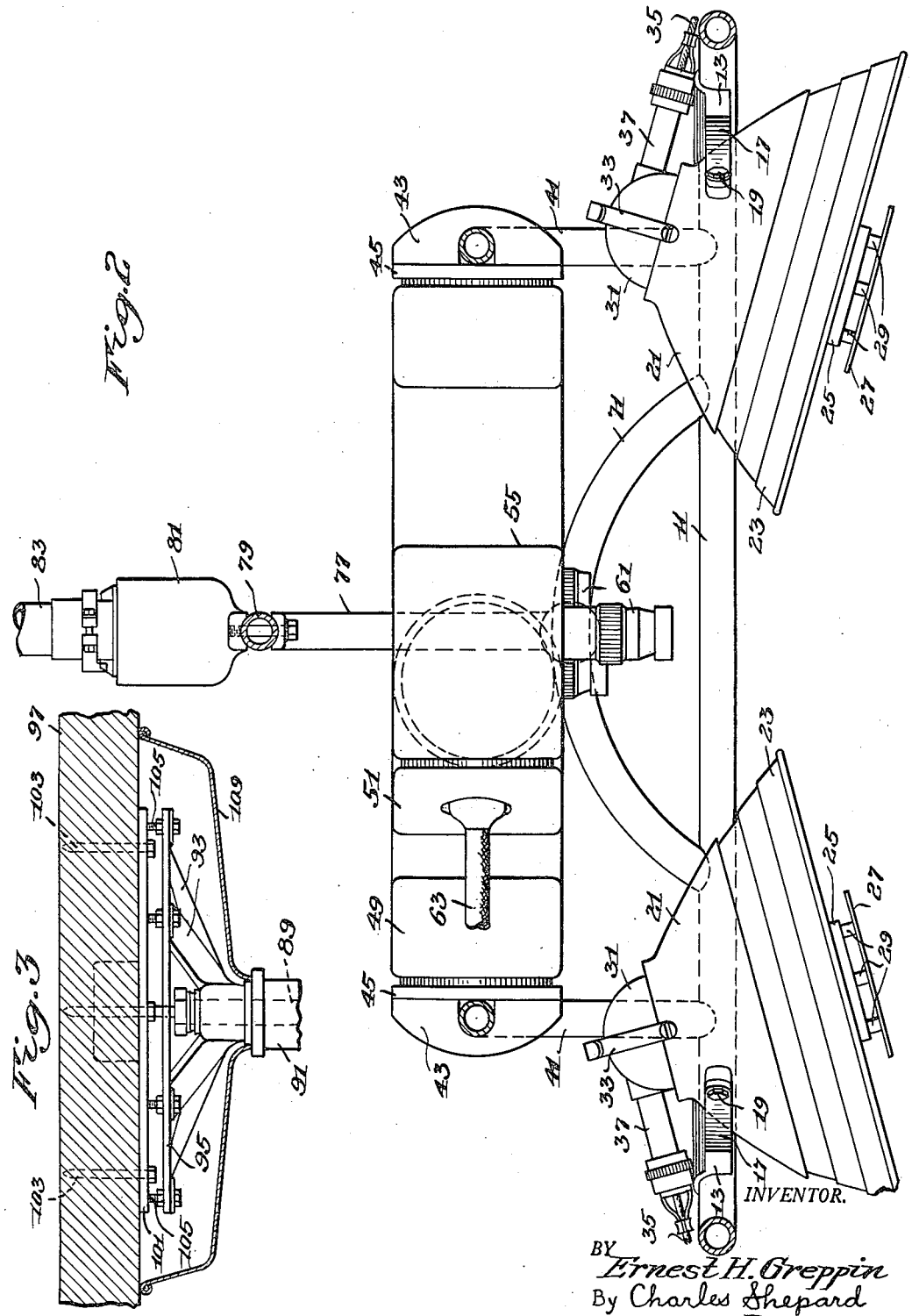

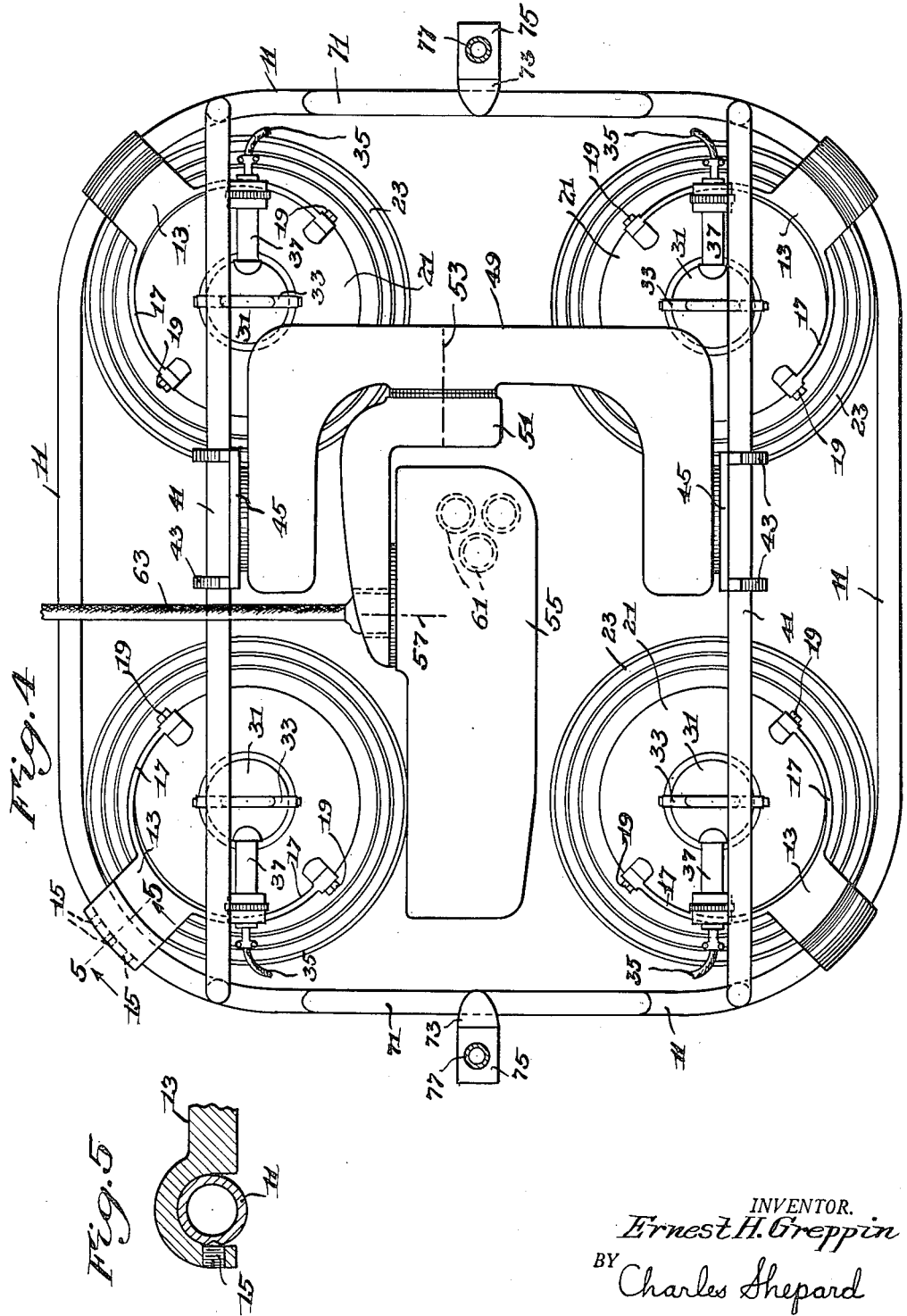

2,758,196
SURGICAL LIGHTING SYSTEM FOR TELEVISION AND OTHER CAMERAS

Ernest H. Greppin, Brighton, N. Y., assignor to Wilmot Castle Company, Rochester, N. Y., a corporation of New York Application November 16, 1953, Serial No. 392,356

5 Claims. (Cl. 240—1.3)

The present invention relates partly to photography and optical projection, and partly to illuminating systems, and it has for its broad object to provide a simple, easily operated, and efficient combined adjustable apparatus for jointly supporting a television camera or other type of camera and a lighting arrangement for the camera that will be particularly adapted for use in the crowded and otherwise peculiar conditions existing within a surgical operating room when it is desired to televise or otherwise photograph the performance of a surgical operation.

Another object of the invention is to provide a joint support of this character in which the associated elements will be relatively compactly arranged, yet the camera will be protected from heat generated by the lighting units, either by sufficient separation to avoid direct conduction of heat, or by the passage of cooling air currents induced by convection, or by both.

A further object is the provision of a combination of surgical illuminating means and a camera support, so arranged that in a simple and convenient manner the entire combination may be bodily shifted relative to the surgical operating table, and also each individual lighting unit may be adjusted relative to the other lighting units and to the camera support, the individual lighting units nevertheless having sufficient space to allow the camera to swing in the desired manner on its support.

These and other desirable objects may be attained in the manner disclosed as an illustrative embodiment of the invention in the following description and in the accompanying drawings forming a part hereof, in which:

Fig. 1 is a side elevation of the apparatus installed on an overhead structure;

Fig. 2 is a transverse vertical section thereof;

Fig. 3 is a detail, partly in vertical central section, of the overhead mounting appearing in elevation in Fig. 1;

Fig. 4 is a top plan view, partly in horizontal section; and

Fig. 5 is a detail section of one of the light supporting brackets taken on the line 5—5 of Fig. 4.

The same reference numerals throughout the several views indicate the same parts.

Referring more particularly to the drawings, 11 indicates a normally horizontal primary frame which may be generally rectangular and rounded at the corners and preferably made of bent tubing. Any suitable number of surgical illuminating units or surgical lights are carried by this primary frame 11. Ordinarily four such surgical lights are used, and in that case each of the rounded corners of the frame may be provided with a bracket 13 (Figs. 4 and 5) having on its under side a groove for embracing the tube of the frame 11 at the rounded corner, and held securely thereto by a series of set screws or clamping screws 15 threaded through the bracket 13 and having points projecting into the tube 11. Each bracket arm 13 extends in a general direction inwardly toward the center of the primary frame 11, and is bifurcated to provide two arms 17 having at their extremities trunnions or pivots 19 alined with each other and arranged at roughly 45 degrees to the straight sides of the primary frame 11.

In each of the pairs of pivots or trunnions 19 (one pair on each of the brackets 13) there is supported a surgical illuminating unit or surgical light of any convenient form, but preferably of the explosion-proof kind fully disclosed in my pending United States patent application, Serial No. 86,207, filed April 8, 1949, now Patent No. 2,665,369, reference to which is made for the details of construction of the preferred form of surgical illuminating unit here used in the present combination, and the benefit of the filing date of which application is claimed for all subject matter disclosed therein.

In general, the preferred form of lighting unit comprises a main body or bonnet 21 supported from the pivots 19 for oscillating movement thereon, the bonnet 21 serving to support a generally concave reflector 23 and also a globe (not shown in the present application, but fully disclosed in said prior application No. 86,207) centrally disposed within the reflector and closed at its forward end by a plate 25 of porous metal, the pores of which allow expansion of gas within the globe if the lighting unit is used in an explosive atmosphere, yet the pores of which are sufficiently fine to prevent propagation of flame or transmission of explosive igniting temperature to the outside of the globe. The front of the porous plate is covered by a protecting plate 27 of metal spaced forwardly from the porous plate as by means of spacers 29, thereby keeping the plate 27 fairly cool even when the porous metal closure plate 25 becomes quite hot from heat radiating from the incandescent electric lamp enclosed within the globe, so that if the arm or hand of the surgeon or other attendant accidentally gets abnormally close to the lighting unit, it will come into contact with the relatively cool plate 27 rather than with the hot porous closure plate 25.

At the rear end of the bonnet 21 there is a cap member 31 removable from the bonnet and normally held in place by a pivoted bail 33, which cap furnishes the mounting for the socket of the incandescent electric bulb which normally lies within the above mentioned globe, and which can be removed for replacement when burned out, by swinging the retaining bail 33 to one side and taking the cap 31 off of the rear end of the bonnet 21. The electric current wires 35 leading to the bulb socket enter the cap 31 through a gas-tight and explosion-proof conduit section 37 connected to the cap 31. Except for a short section of wiring which is unconfined so as to allow the individual lighting units to be swung on their trunnions 19, the major part of the electric wiring is run through and confined within the various tubular supporting members, as indicated in Fig. 1.

Fixed to the primary frame 11 are two bars 41, preferably of bent tubular form, which extend substantially parallel to each other and which are arched upwardly as best seen in Fig. 1, each bar having an approximately straight central portion and ends which curve down to meet the end sections of the main or primary frame 11. These members 41 are arched upwardly far enough so that they allow ample clearance for adjusting tilting movement of the individual illuminating units 21, etc., on their respective pivots 19, and the members 41 provide the basic support for the television camera from the primary frame 11. Fixed to the two members 41, approximately midway of the length of the primary frame 11, are the brackets 43 terminating in face plates 45 substantially parallel to and faced toward each other, each of these plates 45 being provided with suitable bolt holes 47 (Fig. 1) so that a television camera yoke (Fig. 4) can be bolted in place between the two plates 45.

The television camera itself may be supported from the yoke 49 in any suitable manner known per se in the television art. For example, an angular bracket 51 may be mounted on the yoke 49 to rotate thereon about the axis of rotation indicated diagrammatically by the broken line 53, rotation being effected and controlled by any suitable motor. This bracket in turn carries the television camera indicated in general at 55, mounted for rotation relative to the bracket 51 on the rotary axis indicated digrammatically by the broken line 57. This rotation also is effected and controlled by a suitable motor. The camera is provided with one or more pickup tubes 61 in known manner. A flexible electrical cable 63 carries the electric circuit wires for all necessary functions of the television camera and its operating controls, including circuit wires for the electrical impulses corresponding to the scene viewed by the camera, as well as circuit wires for remote control of the motors which control rotation of the camera relative to the bracket 51 on the rotary axis 57, and rotation of the bracket 51 relative to the supporting yoke 49 on the rotary axis 53. By suitably operating these motors by remote control exercised through the cable 63, the camera may be "panned" relative to the primary frame 11; that is, it may be moved panoramically to alter the direction of viewing relative to the frame 11.

It will be noted that the lens tube or tubes 61 of the camera are located substantially at the optical center of the entire assembly thus far described; that is, substantially at the center of the primary frame 11, and at the center relative to the four illuminating unit 21. The illuminating units are sufficiently close to each other to provide brilliant illumination over the desired operating area, yet they are spaced sufficiently far from each other laterally to allow free circulation of air around the illuminating units themselves and around the camera, which is important in keeping the camera sufficiently cool notwithstanding the relatively high heat generated by the powerful surgical illuminating units. A high degree of heat is detrimental to a television camera; hence it is of considerable advantage, in the preferred practice of the invention, to separate the illuminating units as shown, and to place them on an open or skeleton frame rather than mounting them within a casing or housing, so as to allow free circulation of cooling air around the camera itself.

Due to the upward arching of the camera supporting members 41, in order to clear the illuminating units 21 for adjusting movements on their pivots 19, it is seen that the brackets 43 and the television camera itself are at an elevation substantially above the frame 11 and the illuminating units, when the frame is in a normal horizontal position as shown in Figs. 1 and 2. In order to promote stability of the primary frame 11 on its own support and yet allow it to be tilted when desired with a minimum of effort, it is desirable to support the primary frame a pivotal axis which extends horizontally through the center of gravity of the primary frame and the various parts carried thereby, including the weight of the illuminating units and the weight of the television camera parts. For this purpose, each end portion of the primary frame 11 has fixed to it (for example by welding) an upwardly curved or arched member 71, at the midpoint of which is fixed a trunnion member 73 rotatably mating with another trunnion member 75. The two trunnion members 75 are arranged at the opposite depending ends 77 of a supporting yoke 79 which straddles from above the entire primary frame 11 and parts mounted thereon, as best seen in Fig. 1. The members 79 is, in turn, supported at its midpoint by a bracket 81 rotatable on a vertical shaft 83 which depends from and is supported by a small carriage or trolley 85 mounted for horizontal movement on the elongated horizontal rail 87 supported at its midpoint on a vertical shaft 89 (Fig. 3) which extends upwardly and is rotatable within suitable bearings in a fixed vertical tube 91 secured by a supporting spider 93 to a leveling plate 95 arranged horizontally just beneath the supporting ceiling 97 of the surgical operating room where this construction is to be used.

A mounting plate 101 is firmly fixed to the ceiling 97 as by means of long and strong screws 103. The leveling plate 95 is supported from the mounting plate 101 by a series of leveling screws 105 which can be suitably adjusted to make the plate 95 truly level notwithstanding any possible inaccuracies in the level of the ceiling 97. When the plate 95 is truly level, the tube 91, being perpendicular to it, is truly vertical. Thus the shaft 89 rotates on a truly vertical axis, and the rail 87, being perpendicular to the shaft 89, swings in a horizontal plane. The leveling plate 95, the leveling screws 105, and the spider supports 93 for the tube 91, are enclosed within any suitable canopy 109, for the sake of neat appearance.

With this arrangement, it is seen that there is complete capability of adjustment in any manner normally needed in a surgical operating room. The track 87 may be turned on its vertical axis so as to extend either parallel to the length of the operating table, or transverse to the operating table, or at any other desired angle thereto. The entire illuminating unit may be moved bodily along the track 87 by moving the carriage 85. In this way, the unit as a whole may be brought directly over the patient on the operating table, or to any other desired relationship to the patient if it is not desired to have the light projected vertically downwardly. Whenever the surgeon prefers to have the light directed toward the patient at an angle, the entire illuminating assembly (that is, the primary frame 11 and all the lights mounted on it) may be tilted to any desired angle (within reasonable limits) by tilting the frame 11 on the axis defined by the trunnions 73, 75, and this axis of tilt may be turned or adjusted in azimuth by turning the supporting member 79 on its vertical axis 83. In addition to the tilt of all of the illuminating lamps bodily as a unit, by tilting the primary frame 11, each individual lamp 21 may further be adjusted as desired by tilting it individually on its own trunnions 19. The trunnions 19 of each lamp extend substantially through the center of gravity of the lamp, while the trunnions 73, 75 are at an axis extending substantially through the center of gravity of the complete unit (making allowance for the weight of the television camera as well as the lamps) with the consequence that each of the pivotal adjustments is easy to make, and when the parts are adjusted, they will stay in the adjusted position until purposely shifted to another position, as there is, of course, some degree of friction in each of the trunnions.

The various lamps will normally all be directed or pointed toward the immediately operating area of the patient. Due to the rather large diameter of each reflector 23, the light from each individual lamp will approach any particular point on the patient's body from a number of different directions, thus tending to eliminate shadows caused by the operating instruments or the hands of the surgeon, and giving what is called shadowless illumination. In addition to the shadowless effect produced by each of these operating lamps, the combined result of the several lamps spaced from each other gives an even greater shadowless effect, so that the net result produced is a type of illumination particularly beneficial for surgical operations and especially beneficial for photographing surgical operations by means of a television camera, because shadows are eliminated for all practical purposes and those who are observing the televised operation will see clearly all pertinent details thereof with illumination of approximately even brilliance and without the loss of detail which would be occasioned by shadows.

These beneficial results are attained, as already mentioned, without causing any overheating of the television camera due to the amount of heat generated by the illuminating lamps, and without interfering in any way with the ability of the television camera operator to "pan" the camera (by his remote control motors) during the progress of the operation, as may seem desirable from time to time.

It will be understood, of course, that surgical operations are ordinarily not intended to be broadcast to the general public, but it is frequently desirable to televise them for observation by a selected audience of other doctors, who thus are able to observe the operation, through the eyes of the television camera, from a closer and better location and in greater detail than would be possible if the observing doctors or students were actually present in the usual clinical amphitheatre. However, the place to which the television impulses are conveyed or the manner in which they are employed is immaterial so far as the present invention is concerned.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

Thus although a television camera has been mentioned as being mounted on the camera supports, this is not necessarily the case. Any remotely controlled camera, either motion picture or still, for taking photographs on plates, on film, or on paper, may be used if desired, in place of the television camera.

Also, it has been mentioned above that the assembly is of open or skeleton form, rather than enclosed, so as to allow free circulation of air for cooling purposes. While this is highly desirable and is the preferred form, it is not absolutely essential. But if a casing around the lighting unit assembly is used, it is preferable to keep the lighting units somewhat spaced from the camera, as herein disclosed, to avoid direct conductance of heat from the lighting units to the camera, even if the casing prevents free circulation of air.

What is claimed is:

1. A combined surgical lighting unit and camera supporting structure for suspension from the ceiling of a surgical operating room, comprising a mounting member adapted to be mounted on and supported from the ceiling, a horizontal rail supported from said mounting member for adjusting movement about a vertical axis of rotation, a carriage movable horizontally on said rail, a supporting yoke suspended from said carriage for adjusting movement relative thereto about a substantially vertical axis, a frame supported from said yoke for adjusting movement relative thereto about a substantially horizontal axis, a plurality of lighting units mounted on said frame, and means on said frame for supporting a camera in position to photograph the field illuminated by said lighting units.

2. A construction as defined in claim 1, in which said frame is of relatively open skeleton construction and in which said camera and lighting units are laterally spaced a substantial distance from each other to reduce direct conduction of heat from said lighting units to said camera.

3. A construction as defined in claim 1, in which said frame is of generally rectangular construction and in which there are four lighting units, one mounted near each corner of said frame.

4. A combined surgical lighting unit and television camera support comprising a frame of approximately rectangular outline with rounded corners, a bracket mounted on said frame at each corner thereof and extending in a general direction inwardly toward the center of the frame, a surgical lighting unit pivotally mounted on each bracket for limiting pivotal adjustment relative to the frame, the dimensions of said frame and said surgical lighting units being so related to each other as to allow a substantially open space between said lighting units at the center of the frame, a pair of bridge members connected to said frame and bridging across the same and rearwardly arched to extend behind said lighting units, two opposed brackets mounted respectively on said bridge members for receiving between them a television camera mounting in such location that the optical axis of the television camera will be located approximately centrally relative to said frame and will be directed forwardly in the space between said surgical lighting units and toward the area illuminated by said surgical lighting units, and bearings for supporting said frame.

5. A construction as defined in claim 4, further comprising substantially horizontally extending rail means, a yoke member having depending ends and a central portion between said ends, and means depending from and adjustable along said rail means for adjustably supporting the central portion of said yoke member in any selected one of a variety of positions relative to said rail means, the depending ends of said yoke member carrying said bearings which support said frame, whereby said television camera mounting brackets and said frame may be adjusted relative to said yoke and said yoke may be adjusted relative to said rail means.

References Cited in the file of this patent

UNITED STATES PATENTS

| Number | Name | Date |
|---|---|---|
| 1,321,521 | Green | Nov. 11, 1919 |
| 1,663,656 | Guth | Mar. 27, 1928 |
| 1,909,947 | Greppin | May 23, 1933 |
| 2,069,186 | Hineline | Jan. 26, 1937 |
| 2,114,664 | Gelb | Apr. 19, 1938 |
| 2,215,635 | Collins | Sept. 24, 1940 |
| 2,551,753 | McCullough | May 8, 1951 |
| 2,596,376 | DeGoeij | May 13, 1952 |
| 2,659,038 | Heyer | Nov. 10, 1953 |
| 2,675,462 | Newton | Apr. 13, 1954 |